United States Patent [19]
English et al.

[11] Patent Number: 5,745,777
[45] Date of Patent: Apr. 28, 1998

[54] ANALYZER FOR FREQUENCY MODULATED SIGNALS

[75] Inventors: James David English, Aloha; Daniel J. Park, Portland; Jeffrey R. Owen, Portland; Garth Upshaw, Portland, all of Oreg.

[73] Assignee: Seiko Communications Holding N.V., Netherlands

[21] Appl. No.: 695,254

[22] Filed: Aug. 9, 1996

Related U.S. Application Data

[63] Continuation of Ser. No. 240,349, May 10, 1994, abandoned.

[51] Int. Cl.$^6$ ........................................ G06F 15/00
[52] U.S. Cl. ............... 395/800; 395/183.15; 395/200.9; 395/200.11; 340/825.06; 340/825.44
[58] Field of Search ................ 395/800, 183.15, 395/200.09, 200.11; 340/825.06, 825.44

[56] References Cited

U.S. PATENT DOCUMENTS

| | | | |
|---|---|---|---|
| 4,703,433 | 10/1987 | Sharrit | 364/485 |
| 5,040,111 | 8/1991 | Al-Salameth et al. | 395/184.01 |
| 5,136,634 | 8/1992 | Rae et al. | 379/100 |
| 5,162,723 | 11/1992 | Marzalek et al. | 324/77 |
| 5,343,404 | 8/1994 | Girgis | 364/484 |
| 5,355,529 | 10/1994 | Lihquist et al. | 455/13.1 |
| 5,373,501 | 12/1994 | Roland | 370/250 |
| 5,387,904 | 2/1995 | Takada | 340/825.44 |
| 5,440,559 | 8/1995 | Gaskill | 370/314 |
| 5,452,356 | 9/1995 | Albert | 380/9 |
| 5,528,748 | 6/1996 | Wallace | 395/183.01 |
| 5,592,557 | 1/1997 | Chahabadi et al. | 381/10 |

*Primary Examiner*—Alyssa H. Bowler
*Assistant Examiner*—John Follansbee
*Attorney, Agent, or Firm*—Elmer Galbi

[57] ABSTRACT

An FM signal or protocol analyzer (PA) system: The PA system is capable of analyzing the broadcast signal at many levels, from analysis of the physical RF link to comprehensive analysis of the subcarrier messaging. The PA system is built on a computer including special hardware and software. The custom hardware comprises at least one precision RF receiver and signal processing circuitry. The custom software includes data acquisition, data analysis and data presentation software. As a feature of the present invention, a PA system is designed to be "user friendly." As such, it operates in a windowing environment and makes extensive use of graphical displays. The PA system can operate in a networking environment so the receiver and signal processing circuitry can be physically distant from the user's display and keyboard, in another computer connected to the network. The look and feel of the PA system being operated over a network is similar to the look and feel of a PA system with all its components being local, except for any performance limitations that are imposed by network throughput.

3 Claims, 13 Drawing Sheets

FIG. 10

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| X | X | X | G | BOARD NUMBER | | | I/O BASE ADDRESS | | | | | DEVICE BASE | | DEVICE DEPENDENT | | |

FIG. 11

| A4 | A3 | DEVICE BASE |
|----|----|-------------|
| 0  | 0  | DSP_1 |
| 0  | 1  | DSP_2 |
| 1  | 0  | LCA |
| 1  | 1  | BOARD RESET |

FIG. 12

| d7 | d6 | d5 | d4 | d3 | d2 | d1 | d0 |
|----|----|----|----|----|----|----|----|
| EXT PPS | PPS L2H | DMA IRQ | DMA SRC | DMA CHNL | DMA ENBLE | CNTR RESET | DSP RESET |
| X | X | R/O | R/W | R/W | R/W | W/O | R/W |

REFERENCE CLOCK:
○ THIS CARD    (CARD NAME)
○ THIS MACHINE    (MACHINE NAME)
MACHINE SOURCE
CORRECT BY LAST PACKET

CARD   (CARD NAME)   SETTINGS:
☒ TIMER LOCK: LOCKED BY:        USERNAME
    PRESCALER DEVISOR
CLOCK SOURCE:
○ INTERNAL 10MHz      ○ DSP    ○ EXTERNAL
EXTERNAL CLOCK SETTINGS:
    FREQUENCY IN:
☐ 1 PULSE PER SECOND (PPS)
1 PPS TIME/DATE SOURCE STRING:

ANALYZER FOR FREQUENCY MODULATED SIGNALS

This application is a continuation of application Ser. No. 08/240,349, filed May 10, 1994 which is now abandoned.

BACKGROUND OF THE INVENTION

The present invention pertains to the field of analyzers of modulated radio frequency signals. Specifically, the invention pertains to a digital modulation analyzers usable in networked environments.

There exist digital modulation analyzers for determining various parameters associated with frequency modulation (FM) broadcasts. These modulation analyzers, however, are specialized, relatively high-cost devices.

What is needed is a relatively low-cost, digital modulation analyzer built on an industry-standard computer platform that can communicate over standard networks.

SUMMARY OF THE INVENTION

An FM signal or Protocol Analyzer (PA) system according to the present invention is a system that can independently monitor and validate FM broadcast signals including signals transmitted on a broadcast FM subcarriers. The PA system is capable of analyzing the signal at many levels, from analysis of the physical RF link to comprehensive analysis of the subcarrier messaging.

The PA system is built on a PC class computer platform which includes special hardware and software. The custom hardware comprises at least a precision RF receiver and signal processing printed circuit board. Each receiver board occupies a single interface card slot in the PC platform. Up to eight receiver boards can be present in a single PC platform. The custom software includes data acquisition, data analysis and data presentation software.

As a feature of the present invention, a PA system is designed to be "user friendly." As such, it operates in a windowing environment and makes extensive use of graphical displays.

As another feature of the present invention, a PA system is designed to operate in a Local Area Network/Wide Area Network (LAN/WAN) environment. In a LAN/WAN environment, the receiver and signal processing circuitry can be physically distant from the user's display and keyboard, in another computer connected to the network. The look and feel of the PA system being operated over a LAN/WAN is similar to the look and feel of a PA system with all its components being local, except for any performance limitations that are imposed by network throughput.

The PA system can be used in several applications. It can be used as transportable test equipment. In this application the PA system is used in the qualification process of FM transmitters for PAGING service. Typical uses of such a PA system might be: (1) Signal strength survey; (2) Baseband spectrum analysis; (3) Monitoring modulation characteristics; (4) Measuring bit error rates; and (5) Transmitter installation testing.

A PA system can also be used as a full-time paging protocol monitor. In this application, the PA system monitors the performance of an operating paging transmission system. One or more PA systems will be located where in combination they can receive signals from all transmitters in the local paging system. From an operator's console, critical performance parameters of the individual transmitters can be monitored as well as critical system parameters. Typical uses of such a PA system might be: (1) Signal strength monitoring; (2) Baseband spectrum analysis; (3) Monitoring modulation characteristics; and (4) paging protocol timing analysis.

A PA system can be used as a Laboratory Research Tool. The PA system is a powerful, precision tool that can be used to support advanced paging research. Typical uses of such as PA system might be: (1) Baseband spectrum analysis; (2) Measuring bit error rate; (3) Multipath analysis; (4) algorithm performance analysis; and (5) Receiver performance analysis.

The presentation of data to the user is an important attribute of the PA system. The proper presentation of data gives both a quality feel to the product and facilitates the understanding of data being analyzed.

Tabular data produced by the PA system may be presented in graphical form. The graphical representation may be selected from XY graphs, contour plots, histograms, 3-D surfaces or tables as appropriate.

All data produced by the PA system also are available in "clear text ASCII" form. This style of output can be useful in situations where the data will be exported to other applications such as spread sheet programs and report generators.

In all data analysis modes, the user has the option to log sufficient "raw" data to reproduce the initial real-time data analysis display. The raw data is recorded onto a permanent storage device such as a disk drive, tape drive, or other mass storage device accessible to the PA system. It is important to note that in some real-time data acquisition modes, certain mass storage devices are inappropriate for data logging because of throughput limitations. The log files contain date, time, critical operational parameters, and optional comments within each file.

The PA system is capable of displaying many critical protocol characteristics to the user. These characteristics can be grouped into "views" that help the user to understand the performance of a particular aspect of the paging system.

In one application of the present invention, the baseband spectrum of a received FM signal is displayed in graphical form with a logarithmically scaled amplitude axis. The display can be either single sweep or continuous sweep, of the average, peak, or instantaneous amplitude.

In another application, the PA system detects the rate of completed messages modulated onto the FM subcarrier. Different types of errors, such as CRC, ECC, and bit error rates can be displayed.

In another application, the PA system displays the bit error rate (BER) associated with a test pattern modulated onto the subcarrier.

In another application, the PA system can display the RF spectrum of the received FM signal. As for the baseband application, the display can be either single sweep or continuous sweep of the average, peak, or instantaneous amplitude on a logarithmically scaled amplitude axis.

In another application, the PA system can display the frequency error of the 19 kHz stereo pilot tone. The phase relationship between the 19 kHz pilot and 66.5 kHz subcarrier signals can be displayed.

In another application, the PA system can also display the timing performance of a transmission stream relative to a selected reference clock. In the present invention, the transmission stream is expected to be a paging data stream modulated onto the FM subcarrier signal.

In yet another application, the PA system can measure and display performance parameters of the baseband signal.

These parameters are the same as those typically provided by FM broadcast industry "modulation monitors."

In another application, the PA system can measure and display the density of modulation of a broadcast FM signal. This application shows a histogram of the demodulated baseband signal.

In a further application, the PA system can display the data within a paging packet that has been modulated onto the FM subcarrier signal. The data may be either normal messaging or system control information.

In all of the above-mention applications, the PA system can log the data to permanent storage for later analysis by other means. Alarms can be programmed to activate when a measured parameter exceeds a selectable value.

The PA system has a comprehensive set of diagnostics. The diagnostic capability of the PA system is sufficient to detect faults that would degrade the performance of the PA system. Fault isolation is down to a replaceable module level. If a diagnostic test is able to detect a fault in a component or function within a replaceable module (e.g., a faulty IC), that component or function will be identified.

Diagnostic self test is automatically executed at initial power up or system reset. Diagnostics may also be executed by the user on demand.

The diagnostic capability of the PA system is also required for manufacturing test. Diagnostic tests for manufacturing which isolate faults below the replaceable module level may require external test equipment.

The data gathering and monitoring functions of a PA system may be physically separate from the display and logging capability of the PA system. From the user's prospective, operation of a PA system where some functions are performed at remote sites is similar to the operation of a PA system where all the functions are performed locally, that is, in the same physical cabinet.

A PA system which is operated with remote functions has degraded performance only with respect to reduced information bandwidth due to networking. There is no other reduction in PA system functionality attributable to remote operation.

The physical connectivity of networking includes an RS232 link. Other physical network connections (such as 10BaseT, thin-ethernet, etc.) can also be supported.

These and other features, advantages, and objects of the present invention will be made more clear when considering the following specification when taken in conjunction with the appended drawings.

BRIEF DESCRIPTION OF THE DRAWINGS

FIG. 10 is a table showing the addressing of core boards within a host computer's port address space.

FIG. 11 is a table showing the addressing of devices on a core board

FIG. 12 is a table showing the protocol analyzer control and status register.

FIGS. 15–17 show user interface screens displayed by the PA system.

DETAILED DESCRIPTION OF THE INVENTION

Figure 1:
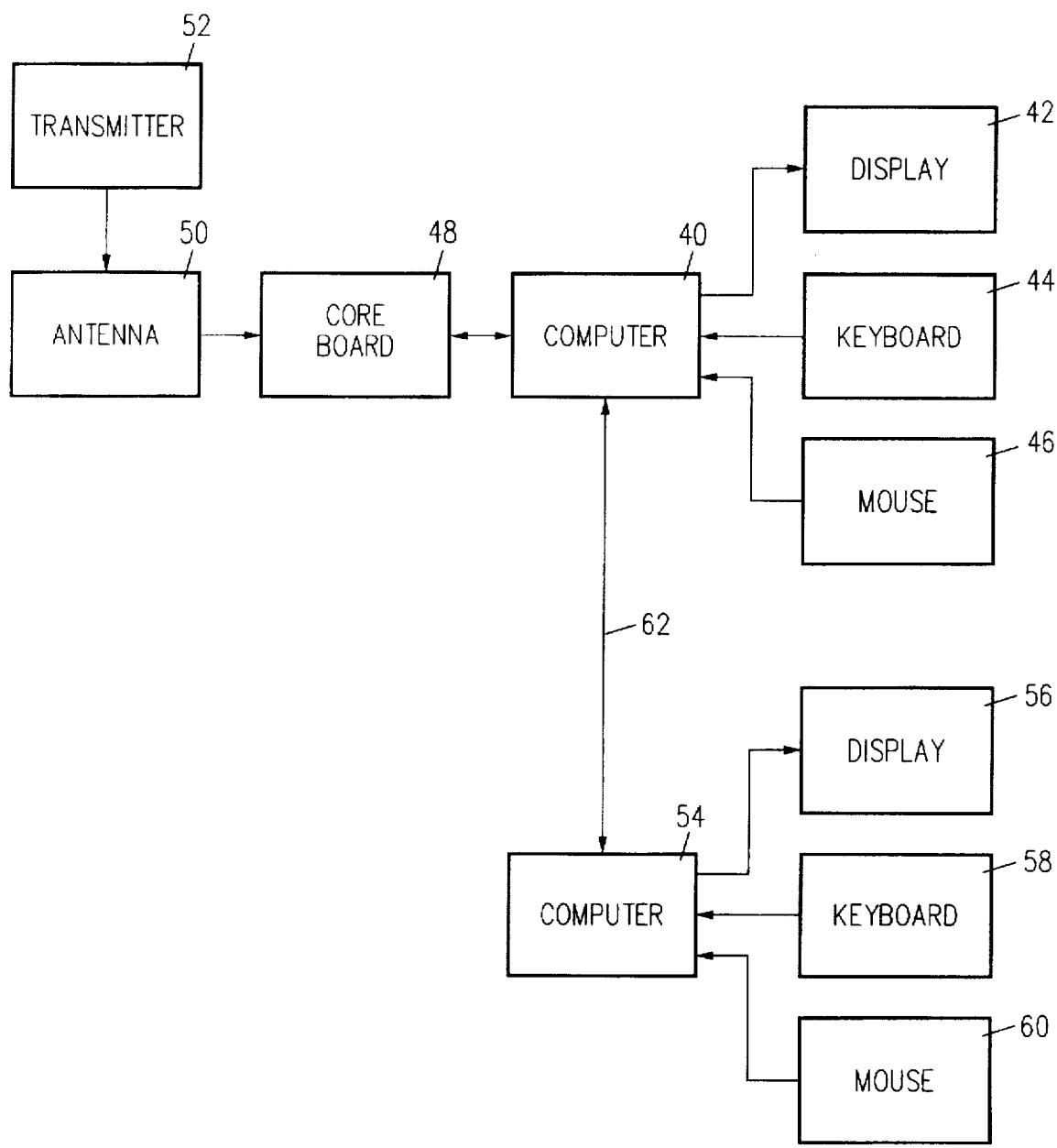
FIG. 1 is a general block diagram of a protocol analyzer system according to the present invention.

Referring now to the drawings, and with particular reference to FIG. 1, a PA system according to the present invention includes a PC-class computer 40 and certain specialized hardware and software.

As is standard for a typical PC-class computer, the computer that serves as part of the present invention 40 has associated with it a graphics display 42, a keyboard 44, and a pointing device, such as a mouse 46. The computer 40 will be discussed in more detail below in reference to FIG. 2.

The custom hardware for the present invention is located on a "receiver and signal processing circuit board" or "receiver board" 48 which is installed in the computer 40. The receiver (or core) board 48 is connected to an antenna 50 which receives broadcast RF signals from a transmitter 52 and supplies them to the core board. The core board will be discussed in more detail below.

The custom software includes data acquisition software, data analysis software, and display and interface software. The specific software components will be discussed in more detail below.

In one embodiment of the invention, all of the software runs on the same computer 40 that contains the core board 48. In the block diagram of FIG. 1, that computer is designated by reference number 40.

However, the PA system is also designed to be able to operate in a Local Area Network/Wide Area Network (LAN/WAN) environment. The block diagram of FIG. 1 shows a second computer 54 connected to the first by a network 62. In this LAN/WAN environment, the core board 48 and data acquisition software may run on one computer 40 that is physically distant from the second computer 54 with its associated display 56, keyboard 58, and mouse 60. According to common networking terminology, the computer 40 that contains the core board and provides its services to the network is termed the "server." The computer 54 that uses the services of the server is termed the "client."

The look and feel of a PA system operated over a LAN/WAN is similar to the look and feel of a PA system with all hardware and software components being local, except for the performance limitations imposed by the throughput of the network 62.

In the block diagram of FIG. 1, the core boards 48 are located in a single server computer 40. It is possible for more than one computer on the network 62 to contain core boards 48 and thus function as a server computer in the PA system. Furthermore, more than one computer 54 on the network may be accessing server computers on the network. There is also no limitation that a computer that contains a core board cannot access another computer that contains another core board.

Figure 2:
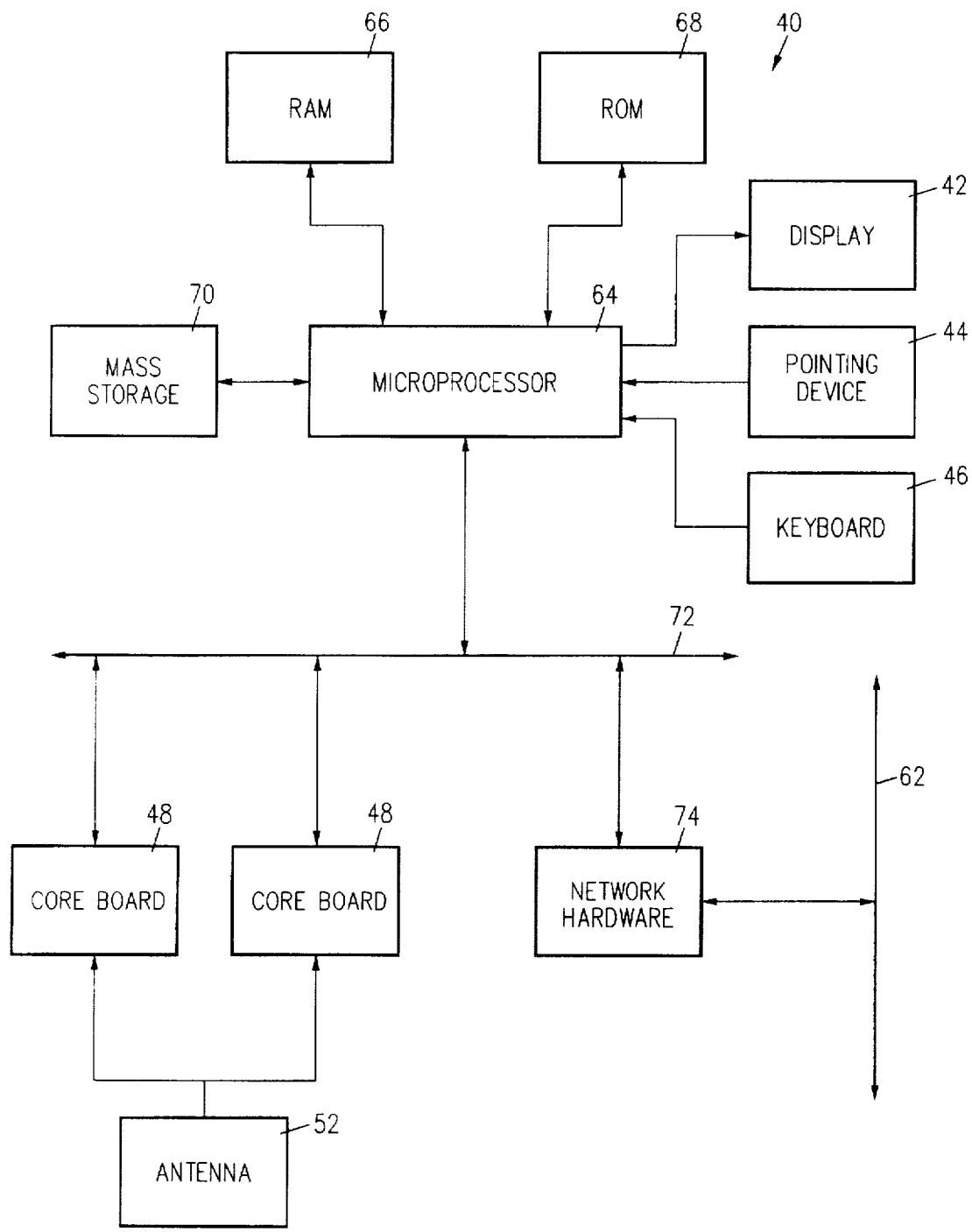
FIG. 2 is a block diagram of the computer shown in FIG. 1.

Referring now to FIG. 2, the computer 40 includes a microprocessor or central processing unit (CPU) 64 with an associated random-access memory (RAM) 66, a read-only memory (ROM) 68, and a mass storage device 70. Also shown are the display 56, the keyboard 58, and the mouse 60 (also shown in FIG. 1).

The computer 40 includes a peripheral bus 72 such as an Industry Standard (ISA) or an Extended Industry Standard (EISA) bus for connecting peripheral devices. In the present invention, the core board 48 is connected to the peripheral bus. The core board contains virtually all of the hardware for the PA system that is not already present in a standard PC class computer. The core boards are connected to the antenna 52 and receive a broadcast signal from it.

In the drawing, two core boards are shown connected to the peripheral bus 72. However, in the disclosed embodiment of the invention, as many as eight core boards 58 may be connected to the peripheral bus. It is noted that the antenna shown in FIG. 2 is not part of unit 40.

The CPU 64 in the computer 40 executes various software routines stored in memory 66, 68 and on the mass storage device 70. Included in these software routines are the data acquisition routines, the data analysis routines, and the human interface routines which are part of the PA system. The data acquisition routines control the operation of the core boards 48 and obtain data that is analyzed by the data analysis routines. The human interface routines control the presentation of data and its analysis on the display 42.

If the PA system is to be used in a LAN/WAN environment, then the computer 40 also includes network interfacing hardware 74 for connecting the computer to the network 62. In the block diagram of FIG. 2, the network interfacing hardware 74 is shown attached to the peripheral bus 72 of the computer 40. It will be clear to those of skill in the relevant art that the network interfacing hardware may be connected to the computer in other, functionally-equivalent manners.

The PA system has two major hardware components: the computer 40 on which the applications and the data analysis software are run and the core board or boards 48 which capture the broadcast signals and measures signal parameters.

Figure 3:
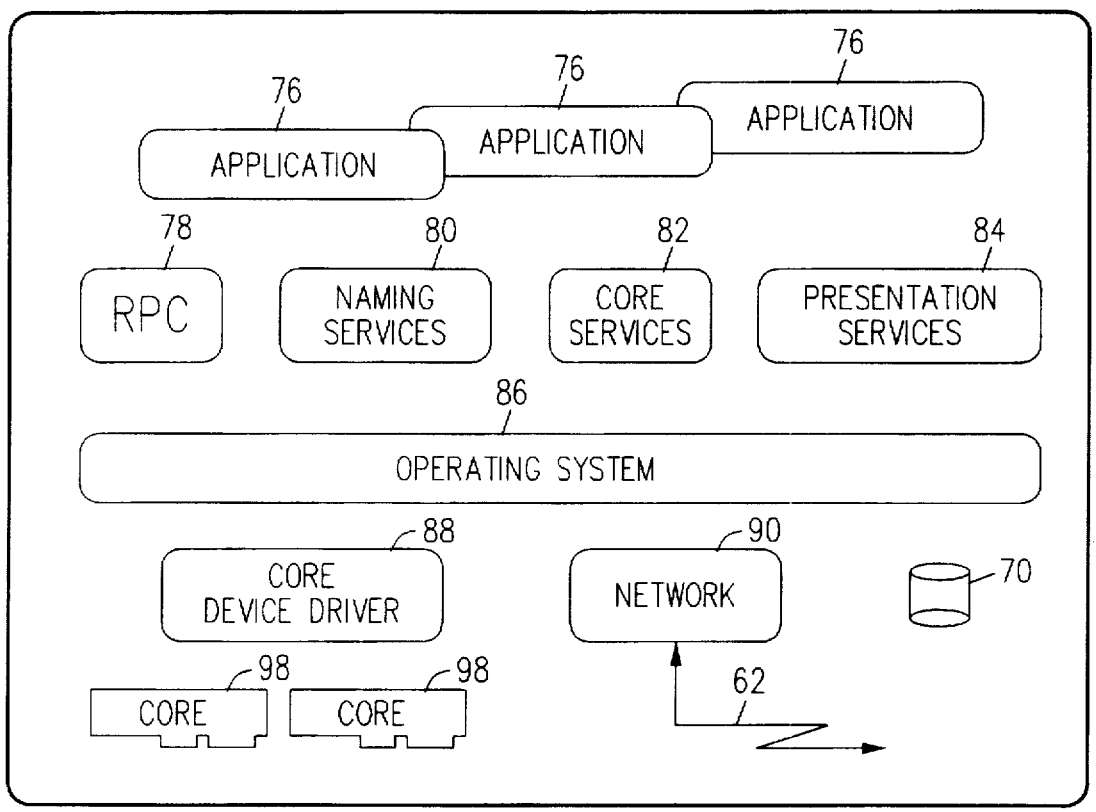
FIG. 3 is a functional block diagram showing the relationships between the hardware and software portions of the protocol analyzer system shown in FIG. 1.

Referring now to FIG. 3, the software that runs on the computer 40 can be organized into layers according to its several levels of functionality. At the highest level of functionality is a set of user "applications" 76, that is, the software discussed above that acquires, analyzes, and presents information to the user. These applications gather information about the performance of the broadcasting system and present it to the user.

Below the applications programs 76 are a set of standard services that are made available to the applications programs. These services are the common set of functions that applications programs will typically require. They are: remote procedure calls (RPC) 78 for networking support; naming services 80 for resource allocation within the network 62; core services 82 for common data reduction, data analysis and core control functions; and presentation services 84 for windowing and data charting functions.

Further down the services stack is the operating system 86 such as DOS or the WINDOWS NT operating system available from Microsoft Corporation.

Below the operating system are the device drivers which directly control the hardware devices installed in the computer 40. The core device driver 88 provides access to the core boards 48 installed in the computer 40 and the network services 90 provide access to the network hardware 74 and the network 62.

Figure 4:
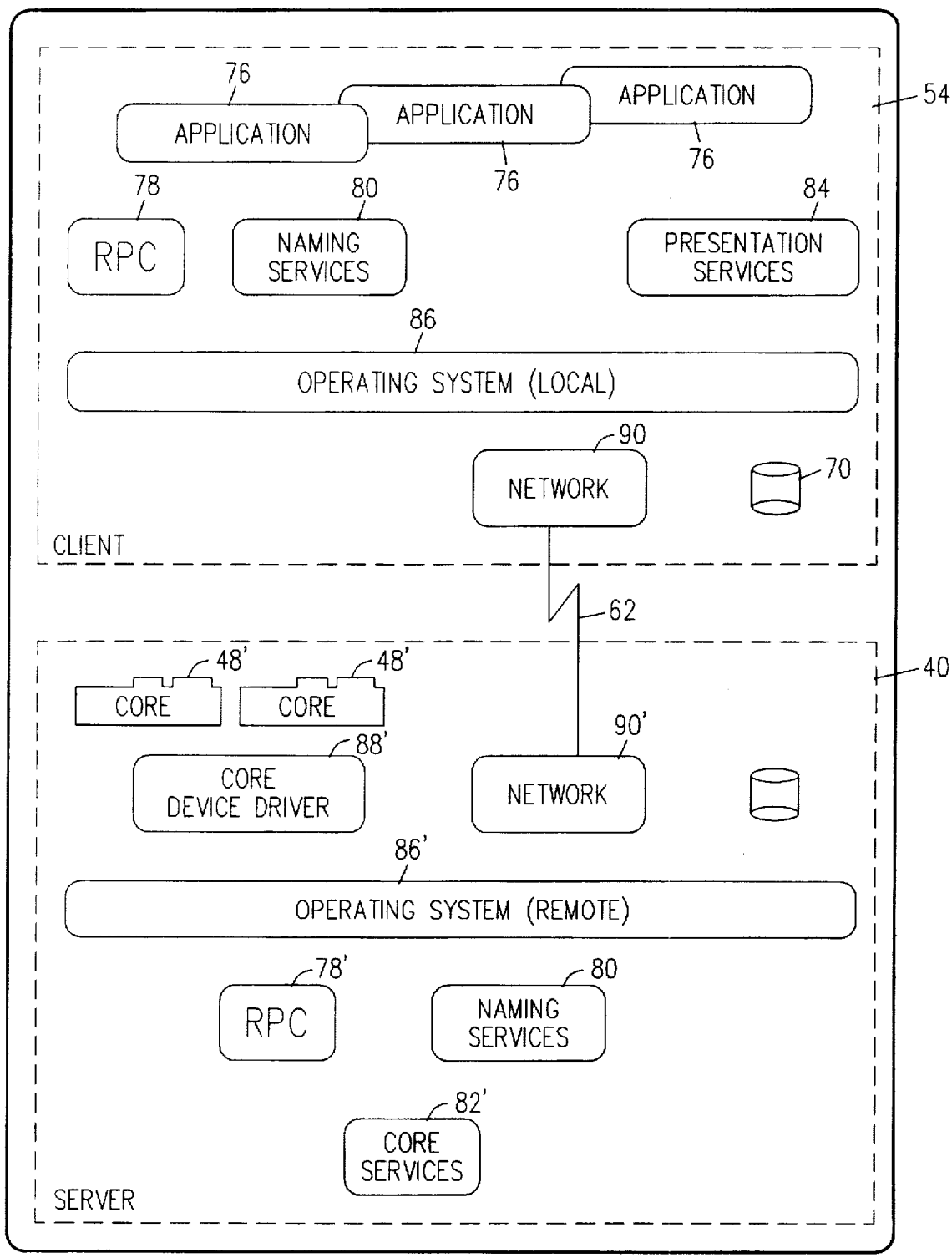
FIG. 4 is a functional block diagram showing the network communication shown in FIG. 1.

Referring now to FIG. 4, in a networking environment, the core services 82 can be several functional layers of software distant from the applications 76. The applications make requests for core services through the RPC 78, the operating system 86, and networking services 90 on the local machine 54, across the physical network 62, and through the network services 90', the operating system 86', and the RPC 78', to the core services 82' on the remote server computer 40. Core services 82' then access the core boards 48' through the operating system 86' and the core device driver 88' on the machine local to core services 82'. In the above discussion the reference numbers which refer to functionality on the server computer 40 are primed to differentiate them from the same functionality on the client computer 54.

If the core board 48 is in the same computer 40 as the application 76, then any network requests and responses are turned around within the network module 90; the same software model discussed in the previous paragraph still applies.

Referring again to FIG. 3, the core board 48 is responsible for capturing broadcast signals and measuring signal parameters of interest. A set of downloadable software modules accomplishes the measurement tasks. Each downloadable software module measures a set of related protocol parameters and generally executes a single command. The core board 48 and the software modules will be discussed in more detail below.

The core device driver 88 controls the core boards 48 in response to requests from the operating system 86, sets up DMA transfers, and processes interrupt service requests from the core boards. The core device driver also tracks the state of pending core board requests from the separate applications 76. Typical requests from the operating system 86 that the core device driver 88 handles are "open," "close," "IOCTL," "initialize," "read," and "write."

The network services module 90 performs all the necessary operations to make the communications between the computers 40, 54 (FIG. 1) invisible to the application programs 76. The network services module maintains the protocol stack (such as TCP/IP, ethernet, token ring, SLIP, PPP, et cetera.) and controls the physical network connection 62.

The type of networking performed by the network function 90 can have an effect on the PA system's performance. Preferably, the network connection 62 has enough bandwidth to support fully the amount data traffic requested by the user applications 76. If the network's bandwidth is insufficient, then the user may notice a degradation in PA system performance. In no case does the PA system application fail to operate because of limited network throughput.

The operating system 86 is the WINDOWS NT operating system available from Microsoft Corporation. The RPC 78, naming services 80, and part of the presentation services 84 are bundled as part of the WINDOWS NT operating system.

When the application 76 is executed on a client computer 54 that is accessing a server computer 40 having the core board 48, the operating system 86 can be the DOS operating system with the WINDOWS 3.1 operating environment. The DOS operating system with the WINDOWS 3.1 operating environment cannot be used on a server computer because DOS currently supports only RPC client functions, not RPC server functions.

The operating system 86 controls the system hardware, that is the mass storage devices 70, the keyboard 44, 58, the mouse 46, 60, the display 42, 56, and the network connections 62.

The RPC service function 78 is the method the PA system uses to implement remote services for user applications 76. The applications make normal procedure calls to perform functions that are required to do the applications work. Some of the procedures are marked as "remote". When the application calls these "remote" procedures, RPC 78 causes the requested function to be executed on the server machine 40 and then the results of the operation are return to the calling application.

In the PA system, the remote procedures are those procedures which analyze data from the core boards 48 and directly control the core boards, that is, the core services 82.

The naming service 80 is a support service to the RPC 78. It is responsible for "binding" an application program 76 to the correct remote core service 82. There may be several remote server computers 40 with core boards 48 on the network 62. An application 76 must select which core board 48 and its associated core services 82 that it will operate with. The naming service 80 maintains the list of available core boards 48 and the services which each core board can support.

The core services 82 are the data gathering and data analysis functions that are performed on the computer 40 local to the core board 48. The application program 76 may or may not be remote. The core services 82 include: downloading executable code into the core board 48; opening and closing the core board; core board data reduction, or data compression, to lower throughput requirements on the network 62; and generating and passing through command structures.

The presentation services 84 are a set of windowing and data charting functions provided to the applications programs 76. The windowing functions are supplied as part of the WINDOWS NT operating system 86 or the WINDOWS 3.1 operating environment and the data charting functions are provided by a purchased library of charting functions. One example of a library is the charting tools library available from Quinn-Curtis.

The applications 76 control the above-mentioned services and hardware to acquire data, analyze the data, and present the data to the user.

The baseband spectrum application 76 collects the baseband spectrum values from the core services software module 82 and displays the information for the user using the services provided in the presentation services module 84. The data throughput is relatively high for the baseband spectrum application. The core board 48 passes data structures of approximately 1 Kbytes, 10 times per second through core services 82 directly to the application. Approximately the same amount of data per second must be passed to presentation services 84 for the data to be continuously updated on the display 42.

The packet completion rate application displays packet completion rate statistics for a set of transmitters sending paging information on their respective FM subcarriers. The data throughput for this application is approximately 2 Kbytes per second (100-byte structures, 20 times per second). Using data compression techniques, the core services 82 can reduce the amount of data that is transferred to the application.

The RF spectrum application module displays the RF spectrum signal strength based on RSSI values across the RF band from 88.0 to 108.0 MHz. The data throughput for this application is relatively low. The core board 48 passes structures of approximately 500 bytes, 2 times per second through core services directly to the application. Approximately the same amount of data per second must be passed to presentation services 84 for the data to be continuously updated on the display 42.

The pilot to subcarrier application displays the phase of the 19 kHz stereo pilot tone relative to the 66.5 kHz subcarrier data. The data throughput of this application is very low, being less than 100 bytes per second.

The protocol synchronization application displays the relative synchronization of a transmission stream to a selected reference clock. The data throughput from the core board 48 to core services 82 is relatively high at approximately two Kbytes per second. However core services analyzes and reduces this data such that only approximately 500 bytes per second of throughput is required to the application.

The modulation monitor application 76 displays the performance parameters of the baseband signal. These are the same parameters which are monitored by FM broadcast industry "modulation monitors." The data throughput to this module is relatively low, being less than 500 bytes per second.

The message and system data application 76 displays the data carried over the paging system. The user selects the type of data to display and the core services 82 functions capture that data from the transmitted data stream and pass the data to the application. Examples of typical types of data include: message to a selected paging ID, system control data, group messages, et cetera. The application module then formats the data and displays it to the user. Data throughput for this module can vary widely. If the user wishes to display all transmitted data, the throughput could be as high as 15 Kbytes per second. The user could filter this down to an extremely low throughput.

The diagnostics application is a special application which tests the core board 48 for proper operation. The core services 82 functions return to the application the results of the diagnostic tests.

Another special application is the calibration application. This application is used to calibrate the core board 48. The core services 82 functions return to the application the results of the calibration operation.

Logging of data is required for all applications. The logging function is part of each application. There will be a set of library routines made available to applications programs to assist in the logging operation and to make them have a similar "look and feel."

The core board 48 is an instrument that can make measurements of radio frequency (RF) signals within the 88 MHz to 108 MHz frequency range. As discussed above, the core board 48 can measure both typical modulation parameters, as well as receive and decode the paging protocol used by the RECEPTOR paging wristwatches available from Seiko Telecommunication Systems, Inc. The core board can determine specific qualities of the signal and quantify these attributes. The core board 48 fits in an ISA/EISA bus slot found in most PC compatible computers.

Figure 5:
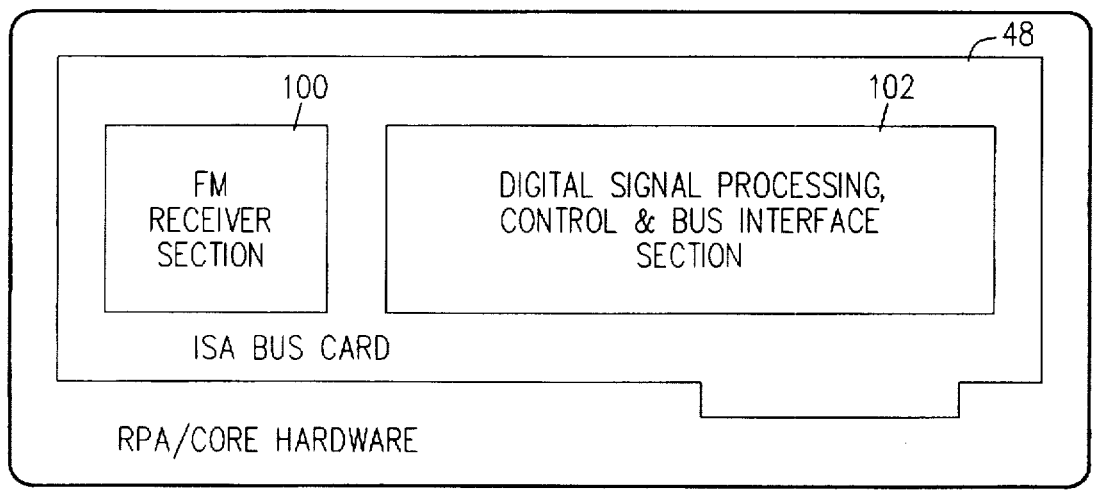
FIG. 5 is a simplified plan view of a receiver board portion of the protocol analyzer system shown in FIG. 1.

Referring now to FIG. 5, the core board 48 is divided into two major sections. The first of these is an receiver portion 100 which includes a high-quality, instrumentation-grade, FM radio receiver with a very high dynamic range. The second major section is a digital portion 102 which includes digital signal processing, control and bus interfacing.

The receiver portion 100 of the core board 48 includes a single conversion, superheterodyne FM receiver having an intermediate frequency (IF) of 10.7 MHz. High side local oscillator injection is used.

Figure 6:
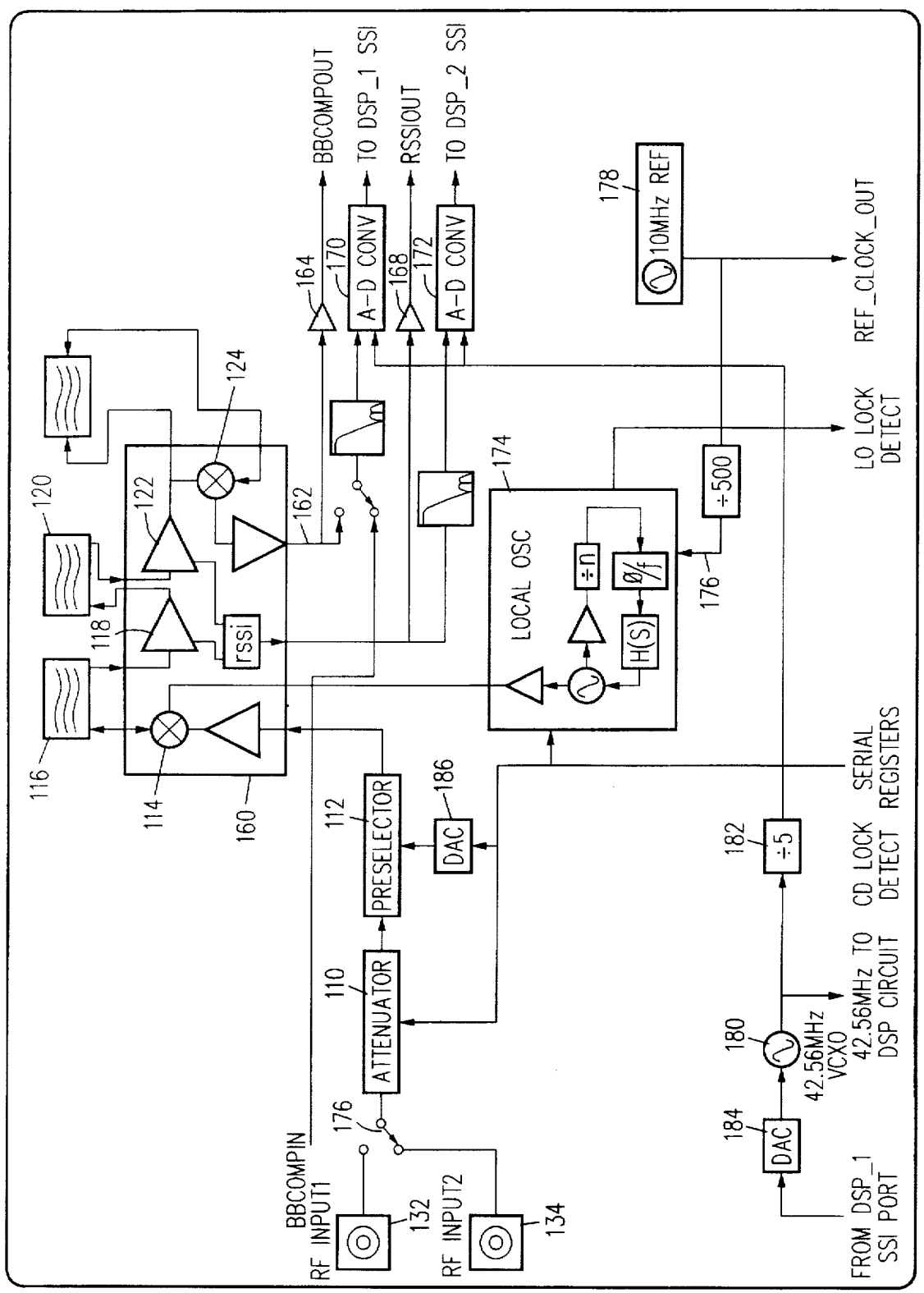
FIG. 6 is a block diagram of the receiver portion of the core board shown in FIG. 5.

As shown in FIG. 6, the receiver portion 100 consists of an antenna selector switch 128 followed by variable input attenuator 110 followed by a preselector 112, an RF amplifier mixer 114, a first IF filter 116, a first IF amplifier 118, a second IF filter 120, a second IF amplifier 122, and an FM demodulator 124.

The variable attenuator 110 provides 0 to 35 dB of attenuation in 5 dB steps. It is implemented as a cascade of 5 dB, 10 dB, and 20 dB attenuators. The variable attenuator 110 receives its input 126 from a switch 128 that connects the variable attenuator 110 to either of two RF input connectors 132, 134. The input connectors can be connected to the antenna 50 or other signal source.

The tunable preselector 112 is a bandpass filter that tracks the input frequency of the core board 48. It has three main purposes. First, it rejects the image 21.4 MHz away caused by the conversion. Second, it keeps large, fast-rising pulses from overloading the demodulator input and causing compression. Third, it attenuates the half-IF conversion product caused by the second harmonic of an input signal at 5.35 MHz above the input frequency. The bandwidth of the preselector is about 3 MHz at the low end of the band (88 MHz), and about 4 MHz at the high end of the band (108 MHz).

Figure 7:
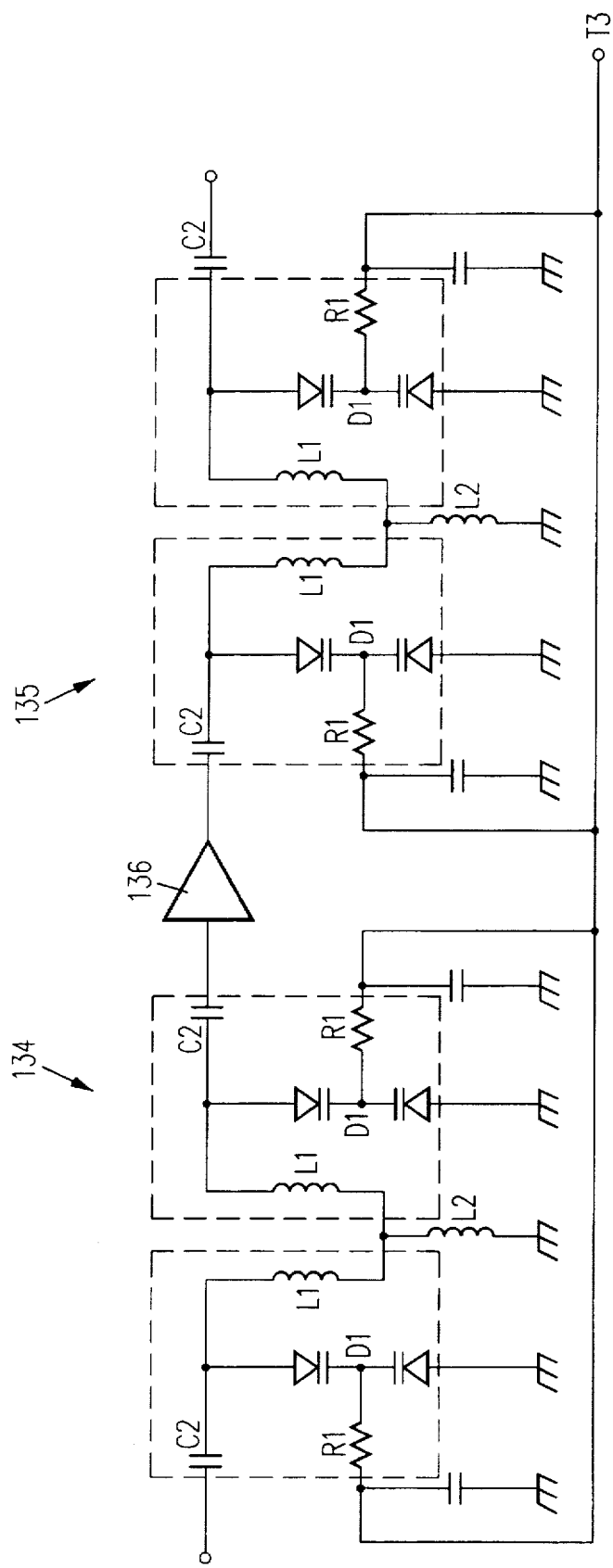
FIG. 7 is a schematic diagram of a preselector used in the receiver portion shown in FIG. 6.

Referring now to FIG. 7, the preselector 112 comprises pair of tunable bandpass filters 134, 135 interconnected by a buffer amplifier 136. Each filter has two resonators comprising an inductor L1 and varactor diodes D1. The varactor diodes D1 act as variable capacitances. Shunt inductive coupling with an inductor L2 is used between the resonators. End coupling capacitors C2 are used to connect to the 50 ohm source and load. The capacitors have a capacitance of 5.6 pF. The resonator inductors L1 have an inductance of 100 nH and the shunt inductors L2 have an inductance of 3.45 nH.

The shunt inductive coupling allows precise control of the coupling coefficient between the resonators 138 and a convenient DC path to ground from the "hot" side of the resonators. The resulting filter has an arithmetically-symmetrical passband and provides excellent rejection of signals far removed from the nominal center frequency.

Figure 9:
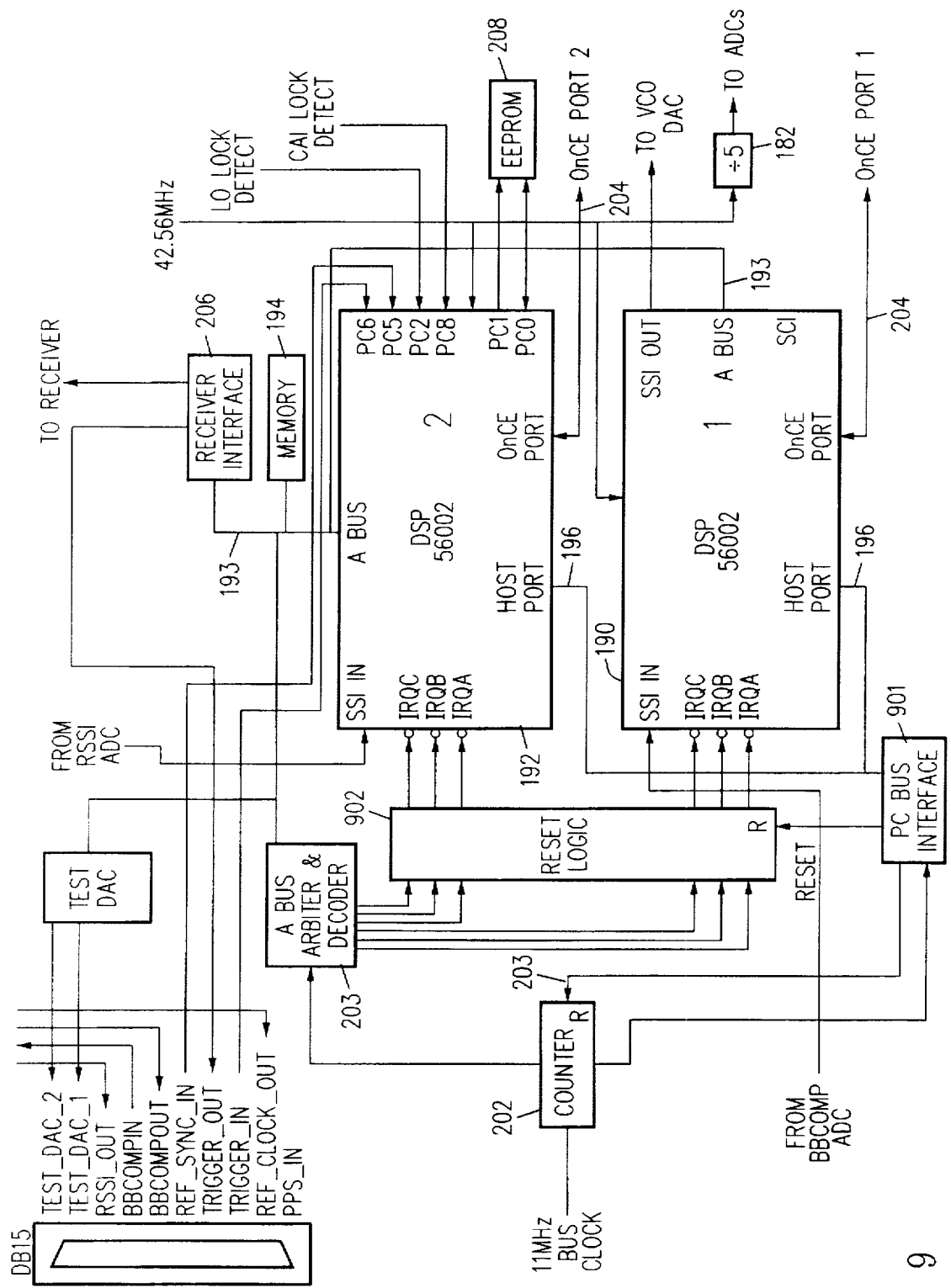
FIG. 9 is a block diagram of the digital portion of the core board shown in FIG. 5.

The center frequency of the preselector 112 is varied by changing the voltage at terminal T3 which is applied to the varactor diodes C1 via resistors R1. The preselector can tune from 88 MHz to 108 MHz. The applied voltage is the output of a digital to analog converter (DAC) 186 (FIG. 6) which is controlled via a serial port of a second digital signal processing (DSP) chip 192 (FIG. 9).

The preselector presents about 6 dB of loss. The loss variation over the entire temperature range is less than 0.5 dB.

Figure 8:
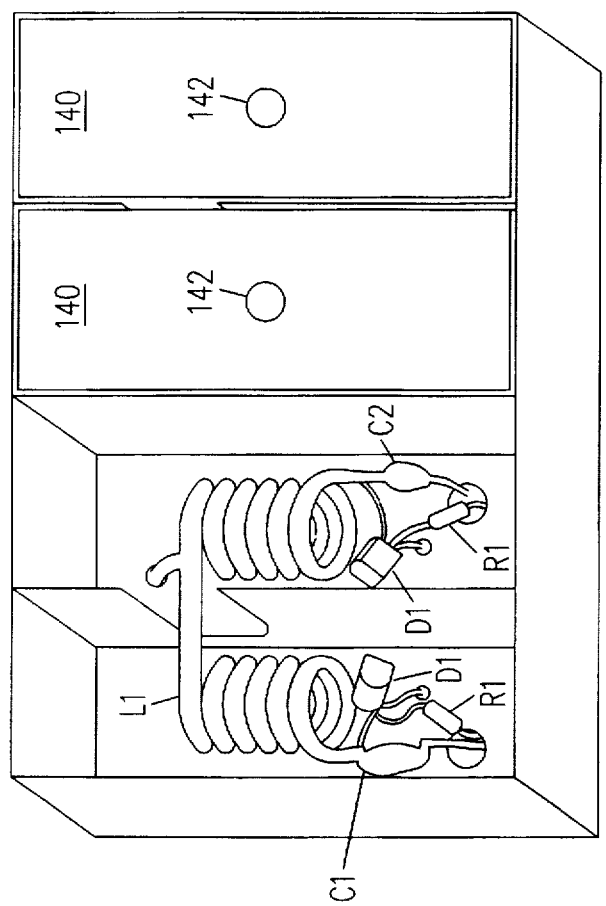
FIG. 8 is a perspective view of the preselector of FIG. 7.

Referring now to FIG. 8, the preselector 112 is constructed within a four-chamber copper shield 138 designed to minimize unwanted electromagnetic coupling between the inductors L1. The two chambers on the left have their covers 140 removed to reveal their contents. In use, all four chambers have their covers in place. The holes 142 in the middle of the covers facilitate the removal of the covers.

Each chamber contains one resonator, that is, one inductor L1 and varactor diode D1 pair. Also visible is the resistive coupling to the control signal. In the first chamber, the input capacitor C2 is seen.

Referring again to FIG. 6, the RF amplifier mixer 114, the IF amplifiers 118, 122, and the quadrature detector 124 are part of a standard integrated circuit, or RF/IF processor 160. The RF/IF processor has a baseband composite signal (BBcomp) output 162 and a received signal strength indicator (RSSI) output 164. Both of these signals are buffered by respective buffers 164 and 168 for use as output signals. Both of these signals also are digitized by respective analog to digital converters 170, 172.

The two A/D converters 170, 172 are identical sigma-delta modulation type converters but are used in different modes of operation. The BBcomp A/D converter 170 is run in a 12-bit mode at a 266 kHz sample rate while the RSSI A/D converter 172 is run in a 16-bit mode at a 66.5 kHz sample rate. Both A/D converters have a built-in voltage reference. The reference located on the BBcomp A/D converter 170 is used for other purposes on the core board 48. All voltage references are referred to this circuit.

A synthesizer 174 on the core board 48 is used to supply the local oscillator (LO) signal to the FM demodulator 114 in the RF/IF processor 160. Its output signal covers the range of 98.7 MHz to 118.7 MHz.

The frequency reference signal 176 supplied to the synthesizer 174 is an internal 10 MHz reference oscillator 178 which is divided by 500 to obtain the final reference frequency of 20 kHz.

The core board 48 has 2 reference oscillators 178, 180. The first reference oscillator is a 10 MHz frequency reference oscillator 178. Its output is used by the synthesizer 174. The 10 MHz oscillator has a cumulative frequency accuracy specification of ±10 ppm.

The second reference oscillator 180 is a voltage-controlled crystal oscillator (VCXO) and has a nominal frequency of 42.56 MHz. Its output is used by the DSPs 190, 192 and A/D the converters 170, 172. It has a pull range of ±120 ppm from nominal. During paging packet reception, this second oscillator 180 is phaselocked to the subcarrier signal.

The output of the 42.56 MHz reference oscillator is divided by five using a digital divider 182 to provide the 8.512 MHz clock to the A/D converters.

The receiver section 100 of the core board 48 has two digital to analog converters (DACs) 184, 186. Both DACs have a serial interface and are controlled by the digital section 102.

The first DAC 184 is an Analog Devices AD-766 and is used to control the frequency of the 42.56 MHz voltage-controlled crystal oscillator 180. It receives its control input from the SSI output of the first DSP 190 (FIG. 9).

The second DAC 186 is used to tune the preselector 112. It receives its control input from the output receiver port of the second DSP 192 (FIG. 9).

Referring now to FIG. 9, the digital portion 102 of the core board 48 includes digital signal processing and support logic. The core board 48 contains two digital signal processor (DSP) integrated circuits 190, 192. Both DSP are part number 56002 digital signal processor manufactured by Motorola. The first DSP 190, is used mainly for decoding paging data. The second DSP 192, is used for paging packet decoding and general control.

The core board 48 uses the first digital signal processor 190 to recover the paging data bit stream from the subcarrier. The BBcomp A/D converter 170 digitizes the baseband composite signal which contains the paging subcarrier. A Costas type phaselock loop is implemented in software to lock the 42.56 MHz external VCXO 180 to a multiple of the subcarrier. Since this clock is used for the A/D converter 170, the effective sample rate is modified to allow the loop to lock. Because the subcarrier is guaranteed to always be within 105 ppm, the pull range of the VCXO is designed to be somewhat greater than this. As discussed above, a DAC 184 controls the VCXO 180.

The core board 48 uses a second digital signal processor 192 to recover the packet information from the paging data bit stream.

Motorola 56002 DSPs have a "port A" or "'A' bus" 193 which can be used to address external memory and memory-mapped devices. This address space is divided into three memory spaces: "X" data memory, "Y" data memory, and "P" program memory. Both of the DSP chips 190, 192 share their "A" buses. A bus arbitration scheme is used such that the second DSP 192 normally has control of the "A" bus, but the first DSP 190 has priority and can access the "A" bus on demand.

The DSP chips 190, 192 access memory in 24-bit words. The external memory 194 uses three 128K by 8-bit memory chips to make 64K by 24-bit "X" and "Y" data memory spaces which are shared by the two DSP chips. Three more 128K by 8-bit memory chips are used to make separate 64K by 24-bit "P" program memory spaces for the two DSP chips.

The DSP chips 190, 192 have a "port B" I/O bus which is also called a "host port." The host port 196 provides direct memory access (DMA) logic for 8-bit DMA transfers. Of the available DMA channels, only one DMA channel is allocated; this channel is shared by all core boards 48 contained within a single computer 40.

Both DSP chips 190, 192 bootstrap off of the host port 196. Thus the operating mode register (OMR) contained in the DSP chips is be the same for both processors. The boot mode is controlled by setting the DSP interrupt pins to a predetermined state upon reset. This is done by the reset control logic through a logic cell array (LCA). Note, LCA includes units 182, 202, 203, and 206. All external interrupts are routed through the reset logic section on the LCA. The LCA will be discussed in more detail below.

There is one 24 bit counter 202 that is internal to the logic cell array 200. The counter uses the 14.318 MHz bus clock prescaled by 64 as a source input. The reset 203 of the counter is available in the host processor port address space. Neither of the DSP chips 190, 192 has access to the counter reset.

The counter 202 provides two counter registers. One of the counter registers is accessible to the second DSP 192 for time stamping packets. The other counter register is available to the host processor 64. The one PPS input will cause this second counter register to be updated.

A 56002 DSP device 190, 192 has three external interrupts available: IRQA, IRQB, and IRQC. External interrupts IRQA and IRQB are used for implementing a mailbox in memory 194. When the first DSP 190 writes to the mailbox, IRQA of the second DSP 192 is asserted. Likewise, when the second DSP writes to the mailbox, IRQA of the first DSP is asserted. When the first DSP reads from the mailbox, IRQB of the second DSP is asserted. Likewise, when the second DSP reads from the mailbox, IRQB of the first DSP is asserted.

The "A" bus arbiter and decoder 203 watches the activity on the "A" bus to determine when to assert the IRQA and IRQB lines of the first and second DSPs 190, 192.

Both DSPs 190, 192 use embedded on chip emulation (OnCE) hardware for debugging purposes. The core board 48 contains a unique OnCE port connector 204 for each of the DSP chips.

A receiver interface, or receiver control port 206, is connected to the "A" bus 193. Because of the "A" bus arbitration logic, the receiver control port is available to both DSP chips 190, 192 within the same address space.

The receiver control port 206 provides the following functions: a three-wire serial bus to control the local oscillator synthesizer 174; a three-wire serial bus to control the attenuator 110, a three-wire serial bus to control the preselector DAC 186, and a general purpose diagnostic DAC 210.

SSI is part of port C. In addition to the "A" bus 193 and the host port 196, the 56002 DSP devices 190, 192 have a third I/O port, called port C. This third port is unused on the first DSP 190. The second DSP 192 uses port C as a general purpose I/O port.

Each core board 48 occupies 32 port addresses in the address space of the host computer 40. In addition, an additional 32 port addresses are mapped into an address space shared by all of the core boards in the host computer such that they can receive commands simultaneously The core board 48 can be programmed to cause an interrupt to the host computer 48. Up to four interrupts are selectable. Additional hardware is added to allow any of the interrupts to be shared. Only one interrupt can be used at a time.

The arbitration circuitry controls of the interrupts from both DSP chips 190, 192. This function can be used to interrupt the host computer 40 or for some other internal function.

The core board 48 has a on-board EEProm 208. The part used is a Xicor 2K by 8 bit (part number X24LC16) with a two-wire serial interface. The4 se4cond DSP 192 uses the unused SCI pins as a general purpose port to interface to the EEPROM.

The host computer 40 uses 16 bits to address I/O ports, and thus has the ability to address 65536 ports. However, typical I/O ports only decode the address bus to 10 bits, limiting a system to only 1024 possible port addresses. A fully loaded host computer having the maximum of 8 core boards would require 256 port addresses to be fully functional, plus an additional 32 addresses for the shared global port. From inspection of the IBM AT technical reference manual, there are not 256 contiguous port addresses available that would not conflict with another possible peripheral. To avoid this problem, 32 available ports in low port space are used for the shared global port. The unique ports are mapped on top of this global port but use the high order bits, A10 ... A15 to specify which core board 48 is being addressed.

Referring now to FIG. 10, the port address used for the core board 48 uses a base offset having a limited range. The base address is selected by setting five jumpers, setting bits A5–A9. The base address can take on values from 0X000 (hexadecimal) to 0X3E0 in steps of 0X020.

When bit A13 is set, the global port is active and all core boards in the host computer 40 are addressed. This works for write only. When bit A13 is not set, bits A10–A12 determine which of the possible eight core boards is being addressed.

Referring now to FIGS. 10–11, bits A3–A4 determine which device on the core board 48 is addressed. As shown in FIG. 11, the host computer 40 can write to the first and second DSP chips 190, 192, or to the logic cell array 200. The host computer can also reset the core board 48, thereby resetting both DSP chips and the LCA.

After a reset, the LCA 200 must be reloaded before the processors can be accessed and before its internal resistor structure can be accessed. The host computer loads the LCA by writing to the LCA's base address. The load file contains about 7 Kbytes of data which are written byte by byte to the LCA under control of the LCA ready/busy status bit. During this configuration period, reading the LCA base address provides a ready/busy status output on bit d7. Ready/busy must be high before a byte can be written. Bits d0–d6 may contain random data.

Refer now to FIG. 12, which shows the control and status register of the LCA 200. This register is equal to the I/O base address. After configuration, the LCA appears as follows:

d0 Reset DSP__1 and DSP__2 when asserted (=1). Set to 0 to deassert reset to processors.

d1 Reset 24 bit counter.

d2 Set to 1 to enable DMA. This will inhibit HREQ interrupts from both processors.

d3 Set to 0 to select DMA channel 0. Set to 1 to select DMA channel 1. upon completion of a DMA transfer (signaled by a terminal count (TC) from the DMA controller) this bit is always toggled. If the second DMA channel is enabled, the transfer will continue.

d4 Set to 0 to enable DMA transfers initiated by DSP__1 HREQ line. d3. Set to 1 to enable DMA transfers initiated by DSP__2 HREQ line.

d5 When =1, in dictates that a DMA completion occurred (and an IRQ pulse was generated) since the last time this register was read.

d6 When =1, counter port latch is latched on the low to high transition of PPS.

d7 When =1, PPS source is external.

During DMA transfers, the function of DSP__1 OnCE port reset signal changes to a PA output pin which indicates which DMA channel is active. (this ungainly muxing of pin function was implemented due to a shortage of I/O pins)

At the next address in the I/O port address space, that is, Base+1 Byte is found the pointer reset/PPS latch read register. The host computer 40 writes to this port address to reset the byte pointer. To access the PPS latch, which is a 24-bit value, the host computer must read this port address three times. The first read gets the low-order byte, the second read gets the middle-order byte, and the third read gets the high-order byte.

Interrupts can be generated by 3 sources. The first two are the HREQ for the first and second DSP chips 190, 192 when DMA is not enabled. The third is upon DMA completion. The DSP__1 and DSP__2 host registers must be polled to find the source.

Since eight core boards 48 can be present in a host computer 40, and only one interrupt line is used, all core boards must share the same interrupt line. For this reason, the interrupt controller must be configured for level triggered interrupts.

To be used as an RF amplitude measurement device, the core board 48 must be able to correct for amplitude errors. Although these errors are small, and thus constitute a small part of the total measurement, the errors must be quantified and corrected. The core board corrects for three sources of amplitude measurement error. These error sources are measured individually and their overall effect is determined by superposition.

A map table for the correction values is determined at calibration time. The resulting error correction terms are stored in the EEProm 208. The size of the memory is purposely picked to be small such that only the most important items will be stored with the calibration coefficients such as board serial number and version number.

The received signal strength error is the deviation from an ideal logarithmic transfer curve of the FM limiter section. The correction table is a 4096 point table in memory 194 that provides a map to yield a 12-bit result. The numeric output of the RSSI ADC 170 is used as an index into this correction table.

The table contains the value in dBm incident to the input to the card with no attenuation applied. The table is calculated from a set of error-correction values that are stored in the EEProm 178. Since there is not enough room to store all of the values, the necessary information is derived from the numeric output of the RSSI ADC 170 that was obtained by applying a specific input level in dBm. These 128 values corresponding to input levels of 0 dBm to −127 Bm are stored as 2 byte integers taking up a total space of 256 bytes.

The preselector correction table is a set of 112 2-byte integers that reside in the memory 194 that correspond to the optimum preselector setting for each possible tune frequency. This entire table is stored in the EEProm 208.

The flatness correction map corresponds to the flatness error at each frequency with respect to the frequency at which the RSSI Map was measured. This error is expressed as error in dBm. The values are stored as 112 signed chars that has a value of 0.1 dB per LSB resulting in a total correction range of −12.8 dB to +12.7 dB.

The ADC correction factor is an eight-byte double that represents the 75-kHz deviation error of the ADC circuit. The value is to be multiplied by the calculated amplitude to yield true amplitude. In the case of baseband spectrum, the 20 Log (ADC correction factor) is to be added to the baseband spectrum data point by point.

The SC phase correction factor is an eight-byte double that represents the 66.5 kHz phase error of the PA card. The value is to be added modulo 360° to the calculated phase value prior to display.

The SC amplitude correction factor is an eight-byte double that represents the 66.5 kHz amplitude error PA card. The value is to be multiplied by the SC amplitude to yield the corrected SC amplitude value prior to display.

The pilot amplitude correction factor is an eight-byte double that represents the 19 kHz amplitude error PA card. The value is to be multiplied by the Pilot amplitude to yield the corrected Pilot amplitude value prior to display.

The CRC32 value is the 32-bit CRC of the entire EEProm 208 space minus the location of the CRC32 entry. It is used to verify the integrity of the EEProm contents.

The core board 48 includes internal diagnostics to determine if the synthesizer 174 is working correctly. Because the synthesizer is fundamental to the proper operation of the rest of the system, if the synthesizer is operating correctly, there is a reasonable probability that the rest of the system is likely to be as well.

The synthesizer lock detect lines are observed. If the synthesizers are working properly, the lock detect lines will be in the true (locked) state.

Figure 13:
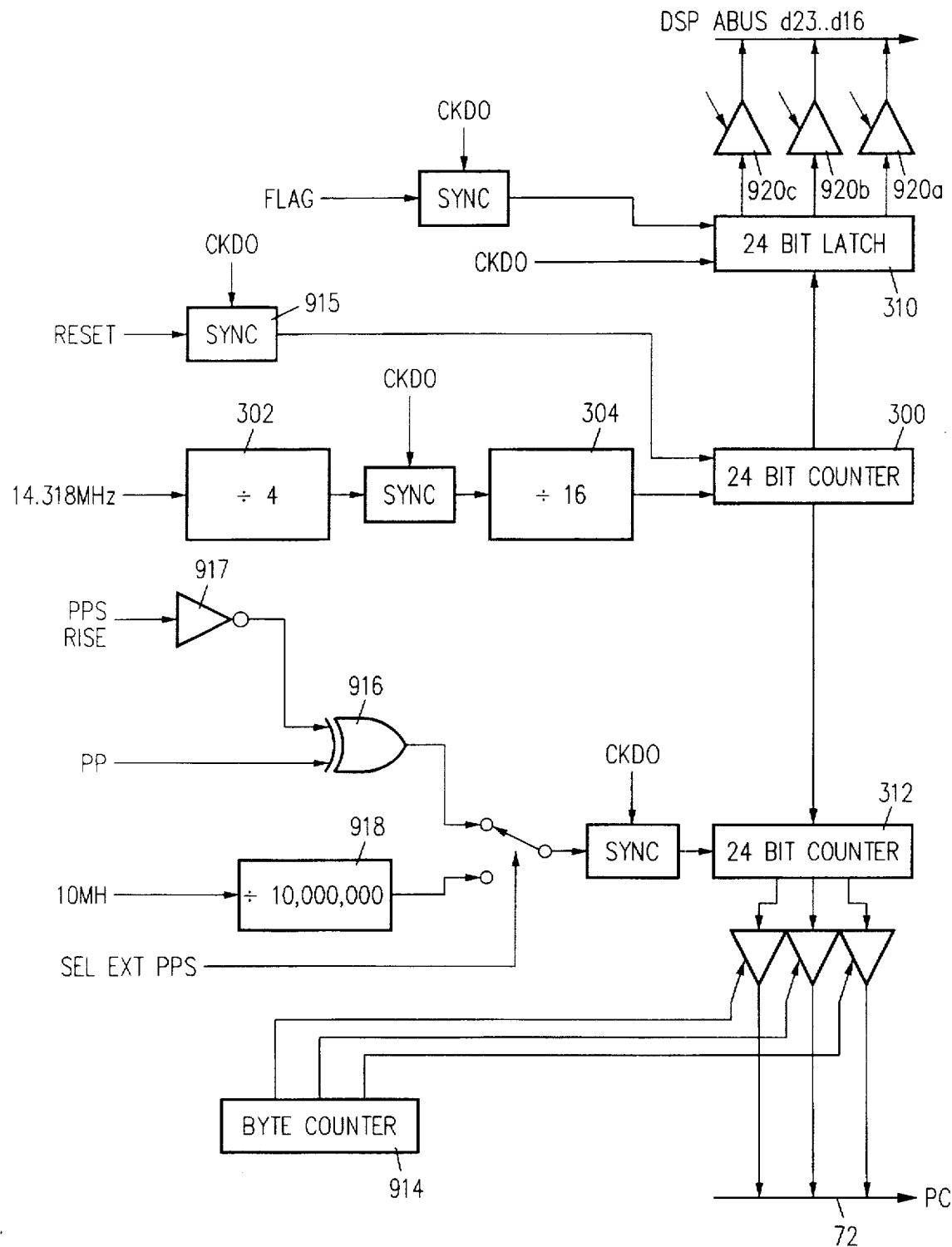
FIGS. 13–14 are functional block diagrams of the logic cell array portion of the core board shown in FIG. 5.
Figure 14:
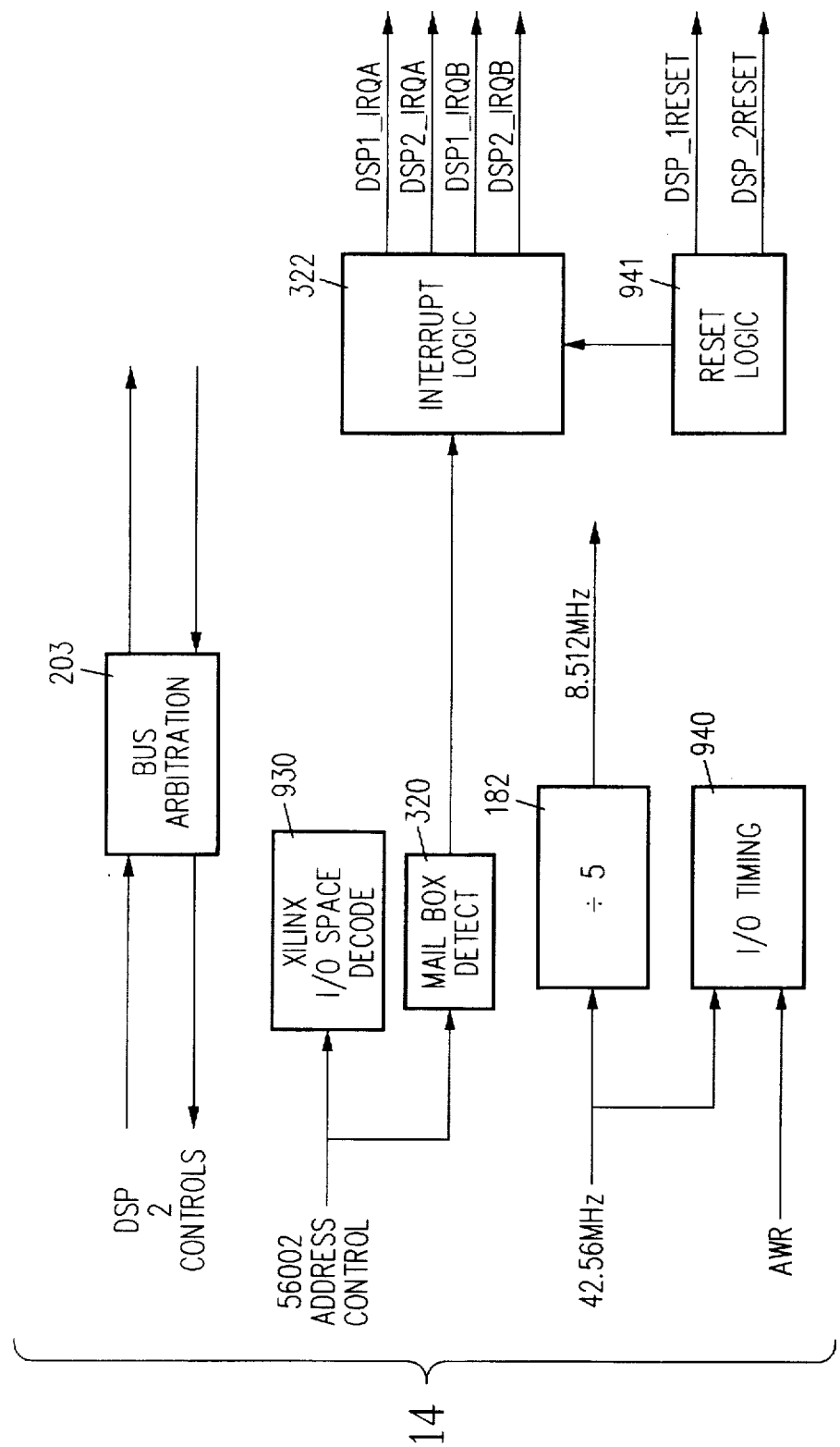

Referring now to FIGS. 13 and 14, the logic cell array (LCA) 200 provides miscellaneous support logic functions for the DSP chips 190, 192. The LCA is a standard XILINX part number 4003.

Referring specifically to FIG. 13, the LCA includes a counter 300 for time-stamping the packets that are sent to the host computer 40. This counter receives a periodic signal from the bus of the host computer that is divided down by frequency dividers 302, 304. The counter can also be manually reset.

The timer 202 is latched by two latches 310, 312. The first latch 310 is on the "A" bus 193 and is thus accessible to the DSP chips 190, 192. The first latch 310 is latched in response to a "FLAG" signal generated in response to detecting the beginning of a paging message on the subcarrier. This allows the PA system to determine the time of reception of paging messages.

The second latch 312 is available to the peripheral bus 72 of the computer 40. This second latch is latched in response to a "pulse per second" (PPS) signal. Thus, the computer 40 is able to determine the number of counts of the counter 202 that correspond to a second of time.

Referring now to FIG. 14, the LCA 200 also includes the arbitration function 203 which controls the shared access of the DSP chips 190, 192 to the "A" bus 193 that is discussed above.

The LCA 200 includes a "mail box detect" function 320 that watches the address lines of the "A" bus 193. When one of the DSP chips 190, 192 writes or reads the address corresponding to the mail box, the mail box detect function notifies the "interrupt logic function" 322. The interrupt logic function controls the IRQA and IRQB lines of the DSP chips 190, 192 to facilitate communication between the DSP chips.

The LCA includes the divide by five function 182 that takes the 42.56 MHz signal from the reference oscillator 180 and supplies a 8.512 MHz signal to the analog-to-digital converters 170, 172.

A multi-step process is used to get a core board 48 from its reset state (caused by either a power-up reset or host-forced reset) to a state where it can process application requests.

After the core board 48 is reset, the logic cell array 200 and the two DSPs 190, 192 execute their internal bootstrap loaders. The logic cell array 200 must be loaded first and then the DSP boot loaders can load extended loader programs. The extended loaders then load a monitor program from the host computer 40 into each processor's program space. These monitor programs are used to load and execute programs from the host.

The logic cell array 200 on the core board 48 must be loaded before the DSP chips 190, 192 can be used.

First, the core board 48 is held reset by writing to the board's reset address. This function is address dependent, the contents of the data byte are not important. If the board has already been reset since power on, it should not need to be reset again. However, resetting the board will not effect the contents of the synthesizer 174, preselector DAC 186, and variable attenuator 110.

The LCA 200 must be loaded before its internal register structure can be accessed writing to the LCA base address will load it. The load file contains about 7 Kbytes of data which is written byte by byte to the LCA under control of the LCA ready/busy status bit. During this configuration period, reading the LCA base address provides a ready/busy status output on bit d7. Ready/busy must be high before a byte can be written. Bits d0–d6 may contain random data.

The resident bootstrap loader on the core board 48 moves binary words from the host computer 40 into the internal program RAM of the DSPs 190, 192 and then executes the loaded programs starting at location 0.

The first program loaded into the core board 48 from the host computer 40 is an extended loader which can load programs into external program space. The program loaded by the extended loader is the monitor program. The extended loader moves binary words from the host into external program memory 194 starting at location P:F000. After the load is finished, the extended loader executes the monitor program starting at location P:F000.

The only currently defined function of this program is to load Motorola DSP56000 Assembler object file format programs into memory and execute them. After the monitor program loads a program, it begins execution of the program at the location specified by the _END statement in the object file. The monitor program remains in high P memory and may be restarted by a Host Command interrupt.

To load and execute the monitor program on one of the DSPs 190, 192, the following steps must be performed. The steps are the same for both DSPs 190, 192.

First, the host computer 40 forces a power on reset on the core board 48. In response, the DSP 190, 192 sets the [HF1:HF0] and [HF3:HF2] to 00, sets its operating mode to 5 (to boot from the host port), and starts executing the BOOT0 program from internal ROM.

Next, the host computer 40 configures the Interrupt Control Register (ICR) and sends the BOOT1 program to 56002 in binary format. When it is finished with loading the monitor program, the host computer sets [HF1:HF0] to 01.

During this time the DSP 190, 192 loads the BOOT1 program into program memory starting at location P:0000 until 512 words loaded. It then sets its operating mode to 0 and starts executing the BOOT1 program from internal program memory. The DSP then loads the monitor program into external program memory starting at P:F000 until either [HF1:HF0] equals 01 or 4096 words have been loaded. Finally, the DSP starts execution of the monitor program for the external program memory.

To load and execute an application program, the following procedure must be executed after the monitor program is executing. These steps are the same for either DSP 190, 192.

First, the host computer 40 clears [HF1:HF0] to 00 and Issue a CVR 0×15 command "Abort Application, load LOD file & HALT".

In response, the DSP 190, 192 executes the CVR command.

The host computer 40 then sends the application program to DSP in Motorola filename.LOD format. The host computer signals the end of file by setting [HF1:HF0] to 01.

The DSP 190, 192 loads the application program into memory until the _END directive is encountered. Thereafter, the DSP reads and ignores any further data. When [HF1:HF0] is set to 01 by the Host, the monitor clears [HF3:HF2] and HALTS.

The host computer 40 then sends the application command parameters to the DSP 190, 192 and issues a CVR 0×19 "Abort, Restart Application"

The DSP starts execution of the application program at the address specified by the _END statement. A result message is sent to the host computer.

To read information from an application or monitor command, the following procedure is executed.

The host issues a CVR 0×1A command "Run Application Command & Continue. In response, the DSP 190, 192 runs the CVR command, clears [HF3:HF2] to 00, and keeps the buffer TXH . . . TXL buffer registers full until the data is exhausted. The DSP then sets [HF3:HF2] to 10.

The host reads the TXH . . . TXL registers until [HF3:HF2] is set to 10. It then returns number of bytes read.

Each software module which runs on the core board 48 is very limited in functionality. A core board program accomplishes one set of analysis functions and returns the result to the host computer 40. Generally, each core board program requires only a start message with a set of parameters before it will execute its function. The results of the execution are passed to the host software in a response message.

Message passing is done between the host processor 64 and the second DSP 192 on the core board 48. Applications executing on the first DSP 190 do not generally communicate directly with the host computer 40. Programs loaded into the first DSP 190 by the monitor program pass their data to the second DSP 192 which further processes the data and forms response messages to the host processor 64.

If the currently executing program on the core board 48 does not handle the desired function, the host computer 40 must select the proper load module, download the module into the core board and then cause the software to execute the desired command.

Messages are passed to a core board 48 DSP 190, 192 by writing the message packet into the Transmit Byte Registers (TXH, TXM, TXL). The [HF3:HF2] bits are set to 00 for all message words except the last. On the last message word the [HF3:HF2] bits are set to 01. The host computer 40 then writes the "Execute Function" Host Command Interrupt number 0×12 to the Command Vector Register (CVR).

Messages from a core board 48 processor 190, 192 are read by the host processor 64 from the Receive Byte Registers (RXH, RXM, RXL). An interrupt from the core board is generated when a new word is ready to be transferred. The [HF1:HF0] bits are set to 00 before each interrupt is generated except on the last data word to be transferred. When the final interrupt is generated for the last message word to be transferred, the [HF1:HF0] bits will have the value 01.

Command messages to the core board 48 contain all necessary information for the board to set up its required state before executing the command. This simplifies the task of making the core board software and host driver routine into "stateless" servers for multiprocess, networked environments. The exceptions to stateless operation are the reference timer and the message data application.

Command messages to the core board 48 have a standard header followed by command specific parameters. The standard header contains all the hardware configuration information required by the core board.

Response messages from the core board 48 contain the results from the execution of the command. A command may cause a single response message or a continuous stream of response messages to be sent to the host depending on the application. If the core board is sending continuous response messages to the host, the host may terminate the command by either sending a new command message to the core board or by resetting the core board.

Response messages to the core board 48 have a standard header followed by result values from the execution of the command. The standard header contains all the current hardware configuration settings of the core board.

One of the fundamental functions of the core board 48 is to maintain a reference timer. This timer is used by application programs to measure time critical system parameters such as protocol synchronization and jitter. The source for the reference timers is the 14.318 MHz host bus oscillator signal (OSC).

The precision of the host bus oscillator, while generally better than 100 pps, is under control of the host manufacturer and is not specified here. In fact, the precision of the host bus oscillator is not a major concern for most applications since this signal is used primarily to synchronize multiple core boards 48 on the same host peripheral bus 72.

Time critical response messages to the host computer are time stamped with the count from the reference timer. The time stamp values are 24 bit counts of the reference signals after the reference signals have passed through a prescaler circuit. The prescaler circuit divides the reference signal by 64. The 24 bit counter rolls over from 0×FFFFFF to 0 on overflow. The time stamps are the values of the counter at the time the counter is latched. The counter is latched at the beginning of the packet data of each 260 bit packet received.

The reference timer is controlled by the host processor through the host port. A reset bit is available that when accessed through the global address will reset all of the 24 bit timers on all of the core boards installed in a computer at the same time, and thereafter their values will track each other. The pps input will latch the port latch on the rising (or falling) edge of PPS depending on the value of the polarity bit set in the RPA control/status register.

The resolution to which an application can maintain time is fixed to 14.318 MHz/64 or about 4.46 uS.

If the external reference signals are traceable to a time of day standard (e.g., NIST) and the application program can resolve time of day down to a second (e.g. RS232 connection to a WWVB receiver or by extracting time of day from a reference RECEPTOR signal) then the application can maintain precise time of day. The external time of day source should supply a accurate mark of the time of day (generally a 1 pulse per second signal). The application program is responsible for capturing an encoded time of day and relating it to the time of day information in the core board response headers.

The HF0 through HF3 bits in the 56002 register set are used for handshaking between the host processor and the 56002. Bits HF1 and HF0 are written by the host processor and read by the 56002. Bits HF2 and HF3 are written by the 56002 and read by the host.

The external "X" and "Y" memory spaces 194 of the two DSP chips 190, 192 processors occupy the same memory space. In general, the second DSP 192 is responsible for managing memory mapped devices. Arbitration of simultaneous accesses into external RAM 194 gives priority to the first DSP 190.

The memory map of "X" space is shown in the following table:

X:0000 to X:01FF: Internal private data.
X:0200 to X:FFBF: Shared External data.
X:FFC0 to X:FFFF memory mapped internal I/O registers.

The memory map of "Y" space is shown in the following table:

Y:0000 to Y:01FF: Private internal program data.
Y:0200 to Y:FFBF: Shared program data.
Y:FFC0 to Y:FFFF: Shared I/O peripherals.
Y:FFBF: Mailbox location.

The DSPs 190, 192 have separate code s pace (both their internal and external "P" space). On both DSPs, the "P" space address range from P:F000 to P:FFFF is reserved for the MONITOR program.

The memory map of "P" space is:

P:0000 to P:01FF: Internal application executable code.
P:0200 to P:EFFF: External application executable code.
P:F000 to P:FFFF: MONITOR program executable code and data.

Figure 15:
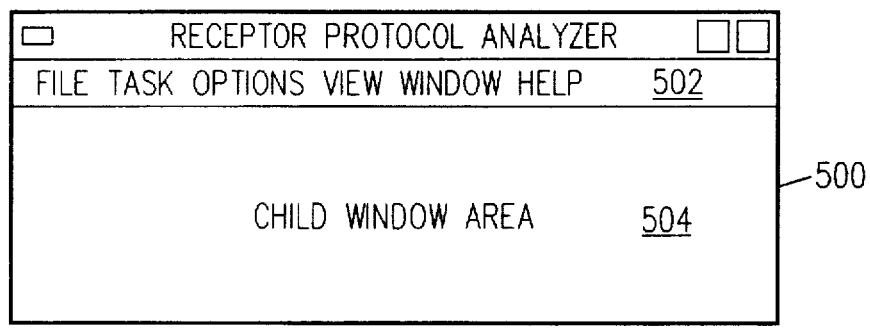

The PA system interface follows the Windows Multiple Document Interface (MDI) format. Referring to FIG. 15, the main window 500 has a menu bar 502 and rectangle 504 that holds zero or more child windows. Each child window is associated with one PA system core board 48 at some location. The child windows do not have their own menus, rather the main window's menu bar acts for whichever child window is selected.

The main menu in an MDI application allows the user to open and close child windows, and serves as the menu bar 502 for whichever child window is selected. The menu options are: File, Task, options, View, Window, and Help.

Under the "File" main menu, is the selection "New PA card." Choosing this selection brings up a "choose PA system card" dialog, creates a project child window 510 (FIG. 16), and sets the focus there.

Another selection under the "File" main menu is "Close" which closes the active child window.

The selection "Open existing log file" under the "File" main menu brings up a standard file open dialog to allow the user to choose a previously created log file. A new child window is created that executes the contents of the log file.

The "Create new log file" selection under the "File" main menu brings up a standard file open dialog to allow the user to create a log file. The log file saves data for whatever task the active child window is executing.

Under the "File" main menu is the selection "Close log file" which closes the log file being generated by the active child window.

"Save configuration" and "Restore Configuration" under the "File" main menu brings up a file dialog box that allows the user to save the current configuration or restore the configuration from a file, respectively.

The "Print" selection under "File" prints the active child window data to the selected printer. For graphic tasks, a snapshot of the graph on the display is printed. For message data, the text buffer is printed.

The "Print Setup" selection under "File" allows the user to change and configure printers using the standard Windows dialog.

Also under the "File" main menu option is the "Print Options" selection which opens a dialog that allows the user to control how graphical attributes are handled during printing. This is only enabled for graphical tasks.

The "Exit" selection under "File" exits the application.

The next nine selections are found under the "Task" main menu option. Each selection allows the user to set the task for the selected project child window. The type of task the selected child window is executing is checked. Most tasks display standard information along the bottom of the screen, for example: RSSI average, RSSI standard deviation, the frequency the card is tuned to, and the attenuator setting on the card. The RF spectrum task only displays attenuator setting.

A "Baseband spectrum" selection shows a baseband spectrum sampled in real time. It Initializes one graph of amplitude vs. frequency using the default graph setup.

A "RF spectrum" selection shows RSSI levels for a wide frequency range. It initializes one graph of amplitude vs. frequency using the defaults.

A "Pilot to subcarrier" selection displays a single number: the pilot to subcarrier phase angle.

A "Modulation monitor" selection initializes one graph with multiple line plots (Total modulation, Pilot inj., RDS inj., paging inj., and AM noise). Red "LED" peak detect flashers are set at the top left corner of the child window to detect total modulation, RDS inj., and paging inj. levels.

A "Protocol synchronization" selection allows the user to examine the data rate error and total bit-time error of a stream of packets. Three graphs, Data rate error relative to 19 kHz vs. Time, Bit time error vs. Time, and Date rate error vs. Bit time error are drawn using default settings.

If the PA system core board 48 is not locked, the user is warned that the card is unlocked and is given the opportunity to lock it before starting this task.

A "Packet Completion rate" selection allows the user to examine the packet completion rate for a stream of packets and to use one or more PCR tasks to start a Message Completion Rate (MCR) analysis. Initializes two graphs, Percent of packets with good CRC values vs. Time, and Bit Error Rate (BER) vs. Time. The child window also shows CRC, and ECC numeric displays. If the PA system Core card is not locked, the user is warned that the card is unlocked and is given the opportunity to lock it before starting the task.

A "Message and system data" selection initializes a text window that displays each message as it is received by the PA system core board 48.

A "Diagnostics" selection sends a "run diagnostics" packet to the PA system core board 48 and displays the results in an information box.

A "Calibration" selection causes the core board 48 to execute its calibration routine.

The next menu selections are found under the "Options" main menu.

A "Lock" selection allows the user to lock a PA system core board 48. Locking the card prevents other users from changing that card's task until an unlock command is sent. This item is checked if the card is locked.

A "Reference Clock . . . " selection brings up a dialog 530 (FIG. 17) which allows the user to set the PA system Core card's reference clock and the reference clock for the PC the card is in.

A "Graph display . . . " selection brings up a dialog that allows the user to change attributes controlling the appearance of the graph.

A "Task options . . . " selection brings up a dialog that allows the user to set options that are specific to the current task.

The next menu selection are found under the "View" main menu option and allow the user to change the way the active child window is viewed.

A "Zoom . . . " selection allows the user to zoom in and out on parts of whatever graphical data is being displayed. Each task has slightly different graphs, so the dialog box is specific to the task.

A "Single step mode" selection allows the user to toggle a mode where the PA system core board 48 is only queried for data when the user wishes instead of in not real time.

An "Execute single step" selection queries the PA system core board 48 and updates the current display. This is only enabled if the board is in Single step mode.

The "Window" menu is standard across MDI applications. It controls the arrangement and selection of child windows. "Tile," "Cascade," "Arrange Icons," and "Close all" operate as is standard for typical Windows applications.

Additionally, a list of "Project child window name n" selections allows the user to select different child windows.

The three following menu selections are found under the "Help" main menu option. A "Card info . . . " selection brings up a message box that shows information about the active PA system core board 48 including the card name, machine name, current task, and the name of who last locked or unlocked the card.

A "Help index" selection brings up the standard Microsoft help application in index mode.

An "About . . . " selection brings up a standard Windows "about" dialog showing the version number and name of the application.

Figure 16:
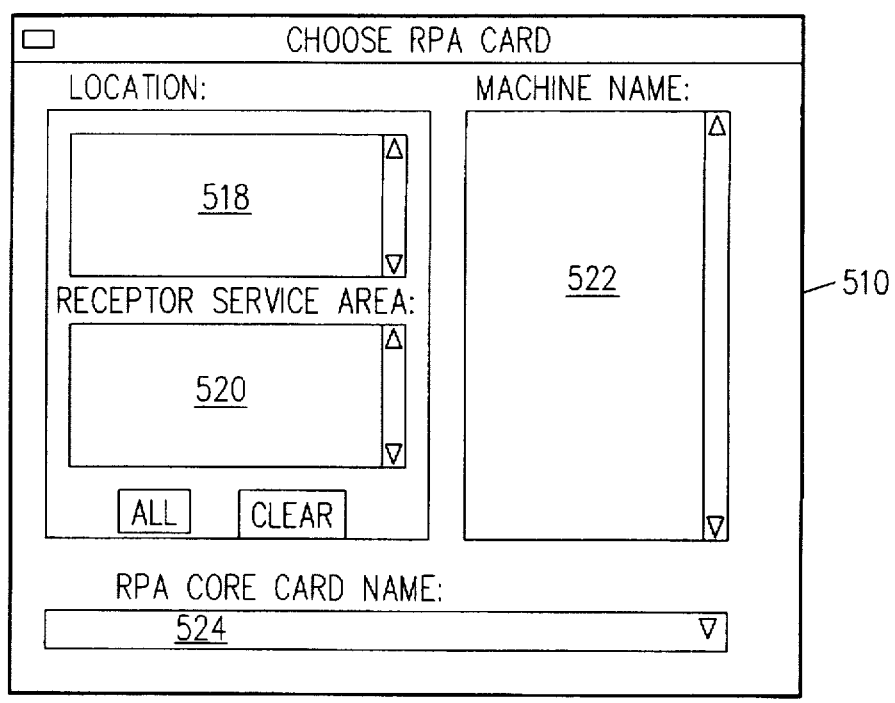

Referring now to FIG. 16, a "Choose PA Card" dialog box 510 presents the data base of PA system core cards 48 in an efficient manner to enable the user to quickly select a particular card to perform the desired task.

The data base of core cards is grouped into a four level hierarchy. The topmost level, location 518, then paging service area 520, machine 522, and the card itself 524. The scrolling list boxes allow the user to select at any level of the hierarchy and to update the machine names list box with all of the machines that are in the selected groups. The user can choose one machine at a time and the PA system core card name combo box is updated with a list of all the cards in that machine. The user can select a card from the card names combo box or can type in the name of a machine and card directly with the machine name separated by a colon (:) from cardname (MachineName:CardName).

Reference clocks provide a way to synchronize events between multiple cards 48 on one computer 40 and to allow all cards on a computer to use a highly-accurate outside source for their clock. The user can set a reference clock for the active child window. They can choose between using whatever clock the active child's core card is set to use or the computer's reference clock. The computer's reference clock can be any of the core cards in the computer or can just be the bus.

Referring now to FIG. 17, the "Reference clock" group of controls allows the user to make the choice between using this card's clock and the machine's clock. If they have chosen "this machine's" clock, then the combo box showing machine source is enabled and the user can select a new machine source.

The "PA system Core card settings" group of controls shows the settings for the PA system Core card that the "Reference Clock" group shows as selected. For example, if the active child window is PA system Core card "card 1" but the user has selected "this machine's clock" and chosen PA system Core card "card 2" as the machine's source, then the settings shown are the "card 2" settings. This entire group of controls is disabled if the machine source is the bus.

The "Timer lock" is a separate security mechanism from the application lock and only affects a user's ability to change the card settings shown in this dialog. If a user has time locked a PA system card 48 then another user who wishes to change the time settings must first unlock the card.

The "External clock settings" group of controls is enabled when the user has selected "external clock" as the PA system core card clock source. "Frequency in" allows the user to tell the software what the external clock frequency is. If "1 pulse per second" is checked, then the user can tell the software where to look for the "time/date" string (COM1, COM2, GPS, etc.)

Certain dialog boxes are used to control the parameters of the task to be performed by a core card 48. A PA system Core card that has been chosen but has not had a task assigned to it has a "No Task" options dialog box that allows the user to set the card frequency and attenuator. All of the options dialog boxes allow the user to reset the frequency and attenuator settings and these settings are preserved when the task is changed.

The "Baseband Spectrum" dialog box allows the user to select the number of points per sample (256, 512, 1024) that will be returned by the PA core card 48 in subsequent queries.

The "RF Spectrum" dialog box allows the user to select the starting frequency (the card's default frequency), the step value, and the ending frequency that will be used by the PA core card 48 in subsequent RF samples.

The "Pilot to subcarrier" dialog box has only the standard frequency and attenuator setting.

The "Modulation Monitor" dialog box enables the user to select which of the graphs to show, and set peak detector threshold percents.

The "Protocol Synchronization" dialog box enables the user to select which of the graphs to show, and set horizontal or vertical arrangement.

A "Packet Completion Rate" dialog box allows the user to select which of the graphs to show, horizontal or vertical arrangement, and can also initiate a message completion rate (MCR) analysis. To start MCR, the user simply pushes the "start MCR" button and is presented with a list of the child windows that are doing packet completion as their tasks. The user can then choose which of the child windows they would like to use in the MCR analysis and those windows will all display the MCR calculated from the selected children's PCR.

Log files store a particular task run on disk so that it can viewed later. They have a header that includes date and time, card name, machine name, user name, task, and task specific information. Each packet of data in the log file looks exactly like the packets that are sent by the PA system core card 48.

Log files are meant to be used to capture short term amounts of data, perhaps overnight at most. Each task requires a different amount disk storage. The tasks that are most suited to longer term log file analysis are Protocol Synchronization (about 1.8 Mbytes/hour) and Packet Completion Rate (about 3.1 Mbytes/hour).

When a log file is opened, the application creates a child window of the correct type (by looking at the task type in the header), initializes a log file manager for the child window, sets the Single step mode on (so the user can view each packet at leisure), and gets one packet's worth of data.

The log file manager intercepts data requests from the child window and returns data packets from the file for each query. When the log file has no more data, a dialog box comes up that lets the user decide between closing that session or restarting the log file.

A log file that is currently being generated closes and reopens its file every 16 packets. This is a safety measure in case of power loss or other system failure. Two different child windows cannot be accessing the same log file at the same time.

Log file errors such as out of disk space, invalid header, invalid packet are handled gracefully, allowing the user to reinsert a floppy and try again and not disabling other tasks that may be processing at the same time.

What is claimed is:

1. A system for analyzing FM radio subcarrier signals that transmit a paging data bit stream in accordance with a predefined protocol, said paging data bit stream including data packets, said system including
    a first personal computer which includes,
        plug in slots for special purpose circuit cards, and a windows operating system,
        means connecting said first personal computer to a network,
        a plurality of plug in circuit cards plugged into said plug in slots, each of said plug in cards including,
            radio receiver means for receiving radio signals of a selected frequency and digital signal processing means for analyzing radio signals received by said radio receiver, said digital signal processing means including,
        first and second Digital Signal Processing (DSP) circuit means,
        said first DSP circuit means including means to recover said paging data bit stream from said subcarrier signal,
        said second DSP circuit means including means to recover data packet information from the paging data bit stream recovered by said first DSP circuit means,
    a second personal computer which includes a windows operating system, means connecting said second personal computer to said network, means for receiving and displaying the data packet information received by said second DSP circuit means, whereby said second personal computer can display data packet information recovered by each of said second DSP circuit means.

2. The system recited in claim 1 further including a third personal computer identical to said first personal computer, said third personal computer being located remote from said first personal computer and connected to said network, whereby said second personal computer can display data packet information collected a plurality of remote locations.

3. The system recited in claim 1 wherein said first computer includes means for calibrating each of said plug in cards and the digital signal processing means on each of said plug in cards includes an EPROM for storing calibrating values, said second DSP circuit means including means for modifying said data packet information in accordance with said calibration values.

* * * * *